US011373457B2

United States Patent
Hoffmann et al.

(10) Patent No.: US 11,373,457 B2
(45) Date of Patent: Jun. 28, 2022

(54) SYSTEM AND METHOD FOR DETECTING NON-APPROVED PARTS IN A VEHICLE

(71) Applicants: ZF Friedrichshafen AG, Friedrichshafen (DE); Kelsey-Hayes Company, Livonia, MI (US)

(72) Inventors: Jens Hoffmann, Friedrichshafen (DE); Rene Seidemann, Friedrichshafen (DE); Shuvo Bhattacharjee, Lavonia, MI (US); Robert Gerd Grütze, Ravensburg (DE)

(73) Assignees: ZF FRIEDRICHSHAFEN AG, Friedrichshafen (DE); KELSEY-HAYES-COMPANY, Livonia, MI (US)

( * ) Notice: Subject to any disclaimer, the term of this patent is extended or adjusted under 35 U.S.C. 154(b) by 192 days.

(21) Appl. No.: 16/666,048

(22) Filed: Oct. 28, 2019

(65) Prior Publication Data
US 2020/0143606 A1    May 7, 2020

Related U.S. Application Data

(60) Provisional application No. 62/756,436, filed on Nov. 6, 2018.

(51) Int. Cl.
| | |
|---|---|
| *G07C 5/00* | (2006.01) |
| *G06F 16/182* | (2019.01) |
| *G07C 5/08* | (2006.01) |
| *G08G 1/017* | (2006.01) |
| *H04L 9/06* | (2006.01) |

(52) U.S. Cl.
CPC ........... *G07C 5/006* (2013.01); *G06F 16/182* (2019.01); *G07C 5/008* (2013.01); *G07C 5/0816* (2013.01);
(Continued)

(58) Field of Classification Search
USPC ...................................................... 701/31.4
See application file for complete search history.

(56) References Cited

U.S. PATENT DOCUMENTS

| | | | |
|---|---|---|---|
| 6,771,168 B1 * | 8/2004 | Nguyen ................. | B60R 25/04 180/287 |
| 6,898,489 B1 * | 5/2005 | Hayes, Sr. ............. | G06K 17/00 340/5.2 |

(Continued)

FOREIGN PATENT DOCUMENTS

WO    WO 2015/170306 A2    11/2015

OTHER PUBLICATIONS

International Search Report and Written Opinion for PCT/EP2019/080391, dated Jan. 15, 2020 (14 pages).

*Primary Examiner* — Tyler D Paige
(74) *Attorney, Agent, or Firm* — Crowell & Moring LLP

(57) ABSTRACT

A method for detecting non-approved parts in a vehicle includes generating a plurality of component identifiers (IDs) for a plurality of components, wherein each component ID identifies a unique component of the plurality of components. The component IDs are stored to a decentralized database. A vehicle identifier (ID) that uniquely identifies a vehicle is generated and stored to the decentralized database. Component IDs associated with components of the vehicle that are stored in the decentralized data base are associated with the vehicle ID. The method includes subsequently, determining that a component of the vehicle has been replaced with a replacement component and searching the decentralized database for a component ID associated with the replacement component. When the component ID associated with the replacement component is not found, the replacement component is determined to be a counterfeit component or a misfit component with respect to the vehicle's ID and an alert is issued to the vehicle indicative of the (Continued)

determination. Otherwise when the component ID associated with the replacement component is found, the decentralized database is updated to associate the component ID associated with the replacement component with the vehicle ID.

19 Claims, 10 Drawing Sheets

(52) U.S. Cl.
CPC ........... *G08G 1/017* (2013.01); *H04L 9/0643* (2013.01); *H04L 2209/38* (2013.01)

(56) References Cited

U.S. PATENT DOCUMENTS

| | | | | |
|---|---|---|---|---|
| 7,945,478 B2 * | 5/2011 | Hogan | ................... | G06Q 10/10 705/20 |
| 8,798,852 B1 * | 8/2014 | Chen | ....................... | G06F 21/44 701/32.6 |
| 2004/0034566 A1 * | 2/2004 | Nagata | ................... | G06Q 10/06 705/22 |
| 2005/0192716 A1 * | 9/2005 | Ito | ........................... | B60R 25/00 701/1 |
| 2005/0253726 A1 * | 11/2005 | Yoshida | ................... | H04B 5/02 340/572.8 |
| 2011/0191829 A1 * | 8/2011 | Fischer | ................. | H04L 9/3234 726/4 |
| 2012/0047544 A1 * | 2/2012 | Bouchard | ............ | G08G 1/0968 725/107 |
| 2012/0123611 A1 * | 5/2012 | Grasso | .................... | B60R 25/00 701/1 |
| 2013/0145482 A1 * | 6/2013 | Ricci | ................ | B60R 21/01512 726/28 |
| 2018/0143995 A1 | 5/2018 | Bailey et al. | | |
| 2020/0167459 A1 * | 5/2020 | Viale | ..................... | G06F 21/335 |

* cited by examiner

| Source address | Description | Destination address |
|---|---|---|
| T1M-C1 | Transfer Gear A with CID SN123456 to Vehicle with VID ABC123456 | OEM-V1 |
| T1M-C2 | Transfer Gear B with UID SN654321 to Vehicle with VID ABC123456 | OEM-V1 |
| ... | ... | OEM-V1 |

Fig. 4A

| Vehicle | Gear A | Gear B |
|---|---|---|
| Model A VID-ABC123456 | SN123456 | SN654321 |

Fig. 4B

| Source address | Action | Destination address |
|---|---|---|
| T1M-C1 | Gear A - SN123456 | OEM-V1 |
| T1M-C2 | Gear B - SN654321 | OEM-V1 |
| ... | ... | ... |
| T1M-C3 | Gear A - SN333456<br>Contract {if used, extend owner warranty}<br>Contract {if used by repair shop, give rebate to repair shop} | OEM-V1 |
| OEM-V1 | Extended warranty | OEM-V1 |
| OEM-V1 | Rebate | RS-R1 |

Fig. 6A

| Vehicle | Gear A | Gear B |
|---|---|---|
| Model A<br>VIN-ABC123456 | SN333456 | SN654321 |
| ... | ... | ... |

Fig. 6B

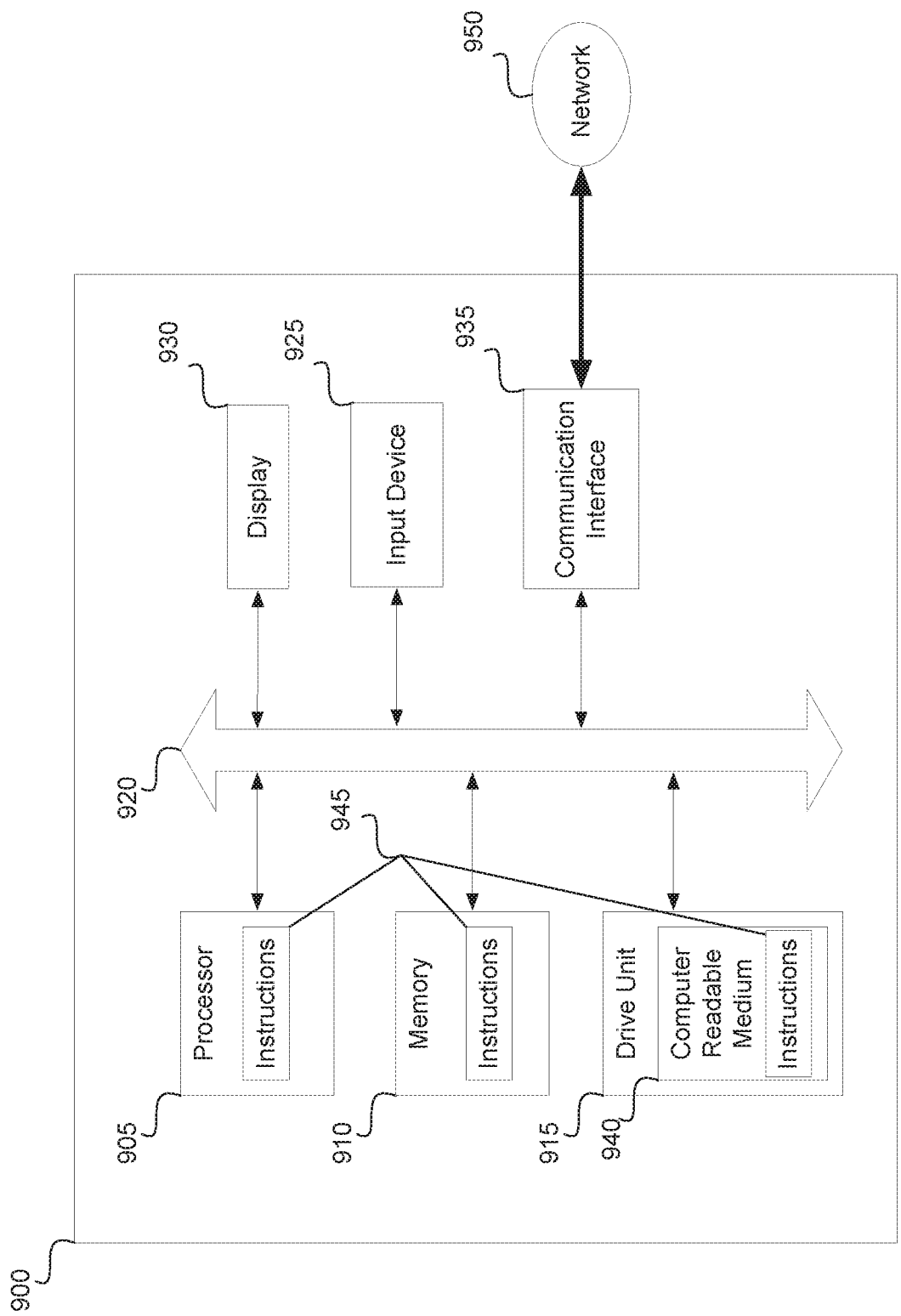

SYSTEM AND METHOD FOR DETECTING NON-APPROVED PARTS IN A VEHICLE

RELATED APPLICATIONS

This application claims priority to U.S. Provisional Application No. 62/756,436, filed Nov. 6, 2018, the entirety of which is hereby incorporated by reference herein.

BACKGROUND

Field

This application generally relates to manufacturing and maintenance processes for complex equipment. In particular, this application describes a system and method for detecting non-approved parts (e.g., counterfeit and/or misfit parts) in a vehicle.

Description of Related Art

Original equipment manufacturers (OEMs), such as vehicle manufactures, rely on components from various suppliers in manufacturing equipment (e.g., vehicles). For example, components and raw materials may be provided by tier 1, 2, and 3 suppliers. The manufactured vehicles may be sold to dealers who in turn sell the vehicles to end users. The end-users may in turn eventually sell the vehicles to consecutive end-users.

When problems with the vehicles occur, the end users may take the vehicles to a repair shop, which may be operated by the dealer or by a third party. In some cases, repair of the vehicle may require replacement of a part. The repair shop may obtain the replacement part from the OEM or directly from an approved supplier of the OEM, or from other $3^{rd}$ party sources.

Unfortunately, to save costs, some repair shops may obtain replacements parts from non-approved suppliers (i.e., suppliers that have not been approved by the OEM). The non-approved part may be produced by a supplier using the brand of the supplier. The non-approved part may be produced by a supplier in the aftermarket that produces counterfeit parts/components and sells the components to the repair shops. In some instances, the non-approved parts may not be entirely compatible with the vehicle and, as such, may be misfit parts. For example, the part may not be rated to handle the environment in which it is placed. The part may be manufactured using inferior techniques. These and other issues with non-approved parts may result in non-operation of the part as required, or an earlier failure of the part and/or the vehicle. In some cases, use of non-approved parts may raise safety concerns that could put lives at risk.

BRIEF SUMMARY

In one aspect, a method for detecting non-approved (e.g., counterfeit and/or misfit) parts in a vehicle includes generating a plurality of component identifiers (IDs) for a plurality of components, wherein each component ID identifies a unique component of the plurality of components. The component IDs are stored to a decentralized database. A vehicle identifier (ID) that uniquely identifies a vehicle is generated and stored to the decentralized database. Component IDs associated with components of the vehicle that are stored in the decentralized data base are associated with the vehicle ID. The method includes subsequently determining that a component of the vehicle has been replaced with a replacement component and searching the decentralized database for a component ID associated with the replacement component. In such a manner, a digital twin is generated. When the component ID associated with the replacement component is not found, the replacement component is determined to be a non-approved (e.g., counterfeit and/or misfit) component and an alert is issued to the vehicle indicative of the determination. Otherwise, when the component ID associated with the replacement component is found, the decentralized database is updated to associate the component ID associated with the replacement component with the vehicle ID.

In a second aspect, a method for monitoring production of components made by a supplier and destined for a specific original equipment manufacturer (OEM) includes generating a record in a database that specifies a plurality of production metrics associated with each of a plurality of components. The method includes monitoring, by each of a plurality of instruction code agents, one or more metrics of the components. Each agent determines whether metrics associated with the components have exceeded one or more production thresholds associated with the agent. When an agent determines that an associated production threshold has been exceeded, an OEM associated with the agent is determined, and the agent communicates an alert indicative of the threshold having been exceeded to the determined OEM via a network connection.

BRIEF DESCRIPTION OF THE DRAWINGS

FIG. 4A illustrates exemplary transactions that may be generated by the OEM system to associate one or more components with a vehicle;

FIG. 4B illustrates and exemplary listing of parts that may be associated with the vehicle upon processing the transactions of FIG. 4A;

FIG. 6A illustrates additional exemplary transactions that may be generated based on the operations of FIGS. 5A and 5B;

FIG. 6B illustrates and exemplary listing of parts that may be associated with the vehicle upon processing the transactions of FIG. 6A;

FIG. 9 illustrates an exemplary computer system that may form part of or implement the systems described in the figures or in the following paragraphs

DETAILED DESCRIPTION

The embodiments described below overcome the problems discussed above by providing a system wherein component and vehicle information are maintained in a decentralized database. Components specified in the decentralized database are manufactured by OEM approved suppliers. Vehicles manufactured by the OEM are given and identified by unique IDs, which are linked to unique component IDs in the decentralized database. Determining whether a non-approved component is installed in the vehicle is based in part on information in the decentralized database. In one implementation, detection may be accomplished by a repair shop or the vehicle owner. For example, a repair shop or the vehicle owner may utilize, for example, a system to scan a bar code, QR code, RFid tag, etc. of the part/component. The system may check whether a part associated with the scanned information is specified in the decentralized database. If not, the component may be determined to be non-approved.

In some implementations, when a non-approved component is detected, an alert may be communicated to the vehicle to alert an owner of the vehicle. In some cases, instructions to deactivate the vehicle if a safety concern is detected may be communicated to the vehicle. The vehicle may then adjust parameters of the vehicle accordingly.

Figure 1:
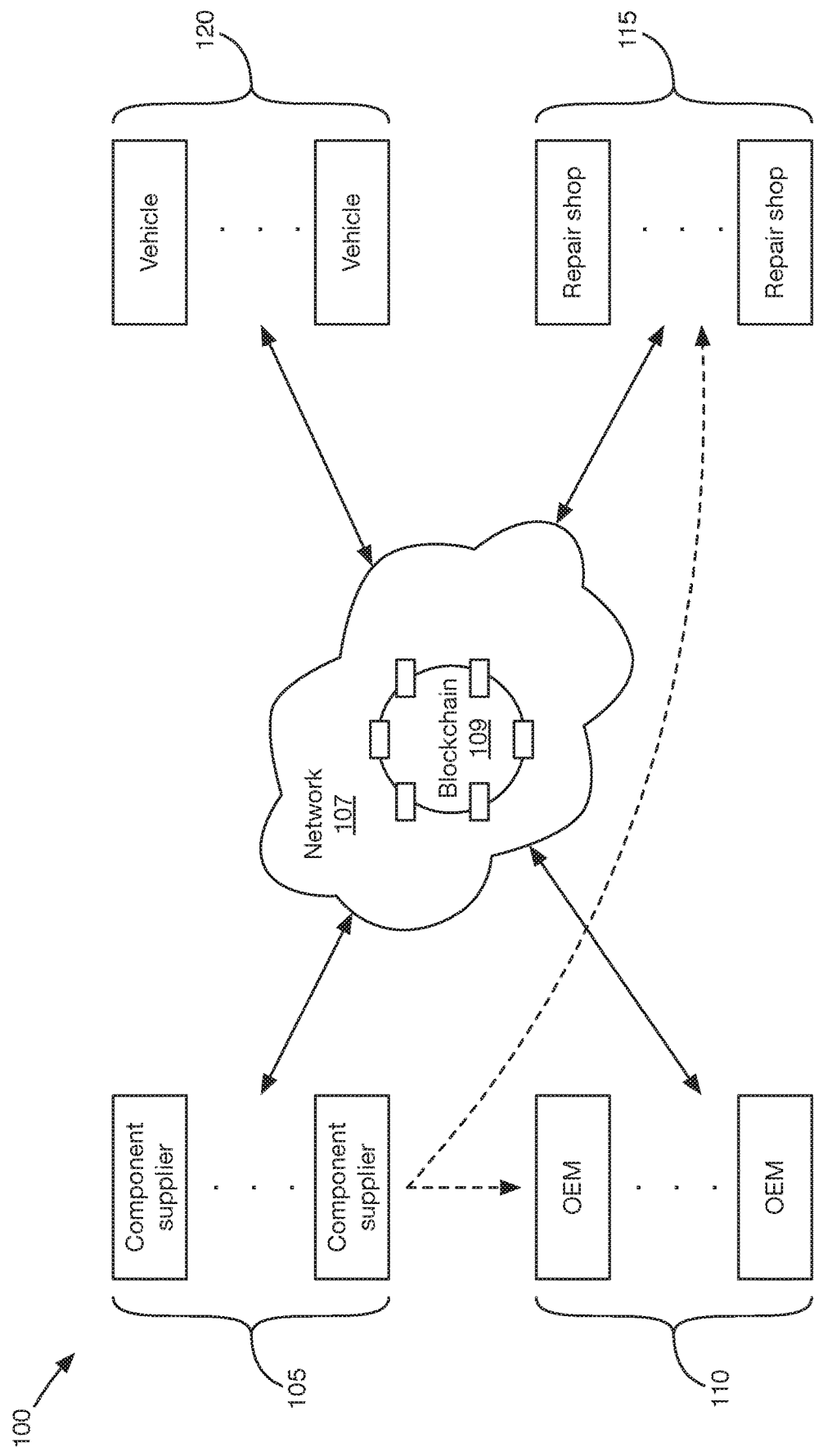
FIG. 1 illustrates an exemplary environment that facilitates detecting non-approved parts in a vehicle.

FIG. 1 illustrates an exemplary environment 100 that facilitates detecting non-approved parts in a vehicle. Illustrated in the environment 100 are entities that include component supplier systems 105, original equipment manufacturers (OEMs) systems 110, repair shops systems 115, and vehicle systems 120.

In the auto industry context, component supplier systems 105 may be operated by component suppliers (e.g., tier 1 suppliers). In this regard, the component suppliers may specialize in making "automotive-grade" hardware. That is, hardware that withstands the motion, temperature, and longevity demands of OEMs. For example, the component suppliers may supply motors, transmissions, engine control modules, seats, windows, and any other of a myriad of components that may go into the manufacture of an automotive vehicle.

The OEM systems 110 may correspond to systems operated by OEMs such as GM, Ford, Mercedes Benz, etc. For cost and efficiency, the OEMs may contract with various components suppliers to provide components needed by the OEM to manufacture an end product such as automotive vehicle.

The repair shop systems 115 may correspond to systems operated by repair shops such as automotive dealers and independent repair shops. Automotive dealers may sell automobiles of various makes and models and may provide onsite facilitates for repairing the same. The automotive dealer may include a parts department that stocks various replacement components for the vehicles. The replacement components may be OEM components. That is, components certified by the OEM as being a suitable replacement for an existing component in a vehicle. Other replacement components may not be certified and may be provided as an alternative to components certified by the OEM to save costs and/or when the lead times in obtaining a certified component is too high.

The vehicle systems 120 may correspond computer systems of vehicles manufactured by OEMs from parts provided by the component suppliers. The vehicles may be operated by end users or fleet provider companies. That is, the vehicle may be operated by both end users/customers and companies that operate a fleet of vehicles (e.g. to provide mobility as a service).

As described in more detail below, one or more systems (105, 110, 115, and 120) may include various hardware components that facilitate interactions with a decentralized database 109 such as a blockchain decentralized database. In this regard, the systems (105, 110, 115, and 120) may communicate with one another via a wired or wireless network 107. For example, the systems (105, 110, 115, and 120) may communicate via the Internet.

Figure 2:
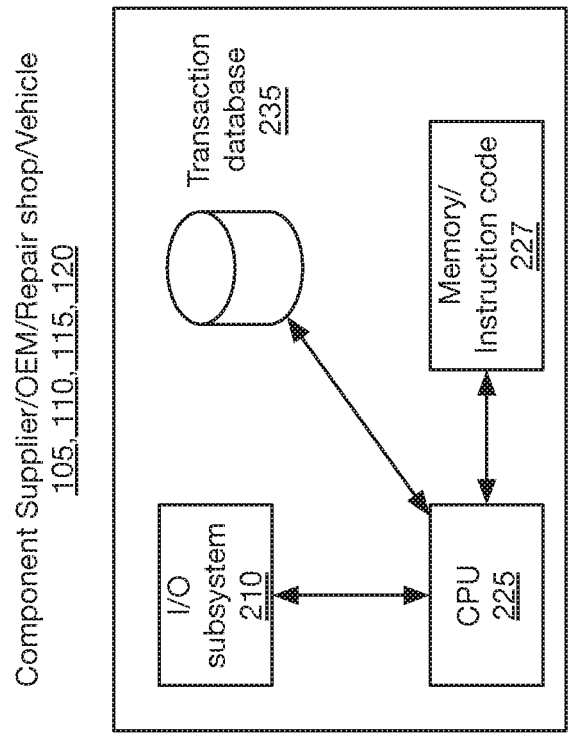
FIG. 2 illustrates an exemplary schematic diagram of various hardware components that may be included in one or more systems of the environment to facilitate interactions with a decentralized database.

FIG. 2 illustrates an exemplary schematic diagram of various hardware components that may be included in the systems (105, 110, 115, and 120) to facilitate interactions with the decentralized database. Referring to the diagrams, each system may include a central processing unit (CPU) 225, input/output subsystem 210, and instruction code memory 227.

One or more systems may also include a distributed transaction database 235. For example, the component supplier systems 105 and OEM systems 110 may include a distributed transaction database 235. On the other hand, the repair shop systems 115 and vehicle systems 120 may interact with a distributed transaction database 235 of one of the other systems rather than include a distributed transaction database 235.

The I/O subsystem 210 of each system (105, 110, 115, and 120) facilitates communications with other systems (105, 110, 115, and 120) of the environment 100. In this regard, the I/O subsystem 210 may implement an API such as a SOAP-based web services API to facilitate communicating information to the other systems (105, 110, 115, and 120). Other APIs, such as a RESTful API, may be implemented to facilitate communications between systems (105, 110, 115, and 120).

The I/O subsystem 210 may be configured to dynamically determine the communication methodology utilized by other systems (105, 110, 115, and 120) of the environment 100 and to communicate information to the other systems (105, 110, 115, and 120) using the determined communication methodology. For example, the I/O subsystem 210 may determine that a first entity utilizes a RESTful API and may, therefore, communicate with the entity using a RESTful communication methodology.

The I/O subsystem 210 may implement a web browser to facilitate generating one or more web-based interfaces or screenshots that facilitate user interactions with the respective systems (105, 110, 115, and 120). In this regard, web services may be implemented to facilitate automating some of the web-based functionality via a computer.

The CPU 225 executes instruction code stored in a memory device 227 for coordinating activities performed between the various subsystems. The CPU 225 may correspond to an Intel®, AMD®, ARM® based CPU or a different CPU. The CPU may perform instructions according to an operating system such as Linux or a different operating system.

Records in the transaction databases 235 of each system are replicated with one another and collectively form a decentralized database that may correspond to a block-chain database. In this regard, the block-chain database may be utilized as a way to construct consensus around the validity of transactions, and to ensure that all changes are auditable.

Stated differently, the block-chain database corresponds to a record of consensus with a cryptographic audit trail that is maintained and validated by each system. Block chains of the block-chain database act as a way to record the order of, and validate the transactions in, the block-chain database. As will be described below, the block chains further facilitate value transfer between the parties—without the usual requirement for a trusted third party. Moreover, such a database facilitates the implementation of smart contracts (e.g. for business rules) that automate processes on such a database (e.g. for defining & delivering incentives to different parties in the supply chain).

It is contemplated that any of the systems described above and/or any subsystem thereof may correspond to a standalone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 3:
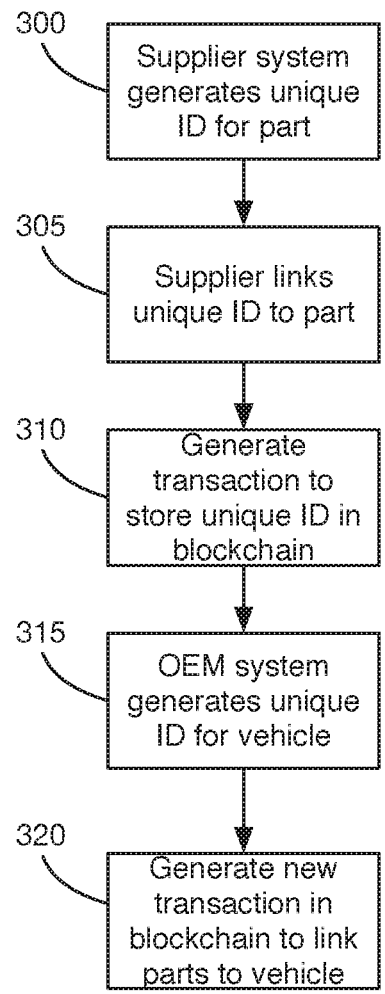
FIG. 3 illustrates exemplary operations that may be implemented by a component supplier and OEM system of the environment to incentivize using genuine OEM parts.

FIGS. 3 and 5 illustrate exemplary operations that may be implemented by the component supplier system, OEM system systems (105, 110) and/or the decentralized database 109 of the environment 100 to incentivize using genuine OEM parts. The various operations may be implemented via instruction code executed by respective CPUs 225 of the systems (105, 110) for causing the CPUs 225 to perform the operations.

Referring to FIG. 3, at operation 300, a component supplier system 105 may generate a unique ID for a component. For example, the component supplier system 105 may generate a unique ID by randomly selecting a number from a very large number range where collisions of numbers are for all intents and purpose unlikely to occur. In some implementations, the component supplier system 105 may provide a user interface through which a user of the component supplier system 105 may request the unique number.

At operation 305, the component supplier may physically link the unique ID to a part. For example, the component supplier may be printed the unique ID on the part. In addition, or alternatively, the unique ID may be represented by a barcode, QR code, or a different code. In some implementations, an RFID with the code may be attached to or provided with the component to facilitate wirelessly scanning the unique ID of the component. In yet other implementations, the unique ID may be affixed or placed within the packaging of the component. In some implementations, the decentralized database 109 includes logic configured to create unique IDs that can be leveraged by other systems. In this case, the supplier system may request the unique ID from the logic of the decentralized database 109.

At operation 310, the component supplier system 105 may generate a transaction to store the unique ID in the distributed database 109. The transaction may include other information such as part name/type, a build date, cost, etc.

At operation 315, an OEM system 110 may generate a unique ID for a vehicle. For example, the OEM system 105 may generate a unique ID by hashing an encrypted master ID with a vehicle identification number (VIN) of the vehicle. In some implementations, the OEM system 110 may request the unique ID from the logic of the decentralized database 109 configured to create unique IDs.

At operation 320, the OEM system 110 may determine the components of the component suppliers used in the vehicle. The OEM system 110 may then store a transaction to the distributed database 109 to indicate that the components provided by the component supplier system 105 are associated with the unique ID of the vehicle.

FIG. 4A illustrates exemplary transactions that may be generated by the OEM system 110 to associate one or more components with a vehicle. Referring to the FIG. 4A, each transaction may include a source and destination address. The source address may be associated with a unique component and may have been generated and associated with the unique component at operation 310. The destination address may be associated with the unique ID of the vehicle.

A first exemplary transaction 405 is used to indicate that a first component at address T1M-C1 is associated with the vehicle at address OEM-V1. The first component in this case is Gear A and has the unique ID (CID) SN123456. The unique ID (VID) of the vehicle associated with address OEM-V1 is ABC123456. Likewise, a second exemplary transaction 410 is used to indicate that a second component at address T1M-C12 is associated with the vehicle at address OEM-V1.

In some cases, encrypted/hashed versions of the unique vehicle ID (VID) and unique component IDs (CIDs) are stored in the transaction database (235) rather than the unique vehicle ID (VID) and unique component IDs (CIDs) illustrated in the figure. Encrypting/hashing of the unique IDs guarantees privacy of vehicle and component information. This facilitates protecting information provided by different OEM and component suppliers. This in turn allows multiple OEMs/suppliers and data partners (e.g., insurance companies, vehicle history report providers (e.g., CarFax), fleet operators, etc.) to utilize the same environment without exposing information in the decentralized database that could potentially be used to determine confidential details about competing OEMs/Suppliers such as potential revenue, vehicle production volumes, etc.

The number of transactions stored to the distributed database 109 may correspond to the number of components in the vehicle. Components specified in the transactions may originate from the same or different component suppliers 105. In addition, transactions may be provided for transferring components of any of the suppliers to different vehicles manufactured by different OEMs.

FIG. 4B illustrates and exemplary listing of parts that may be associated with the vehicle upon processing the transactions of FIG. 4A. According to FIG. 4B, the vehicle associated with unique ID ABC123456 includes components Gear A and Gear B. Gear A has the unique ID SN123456 and Gear B has the unique ID SN654321.

Figure 5A:
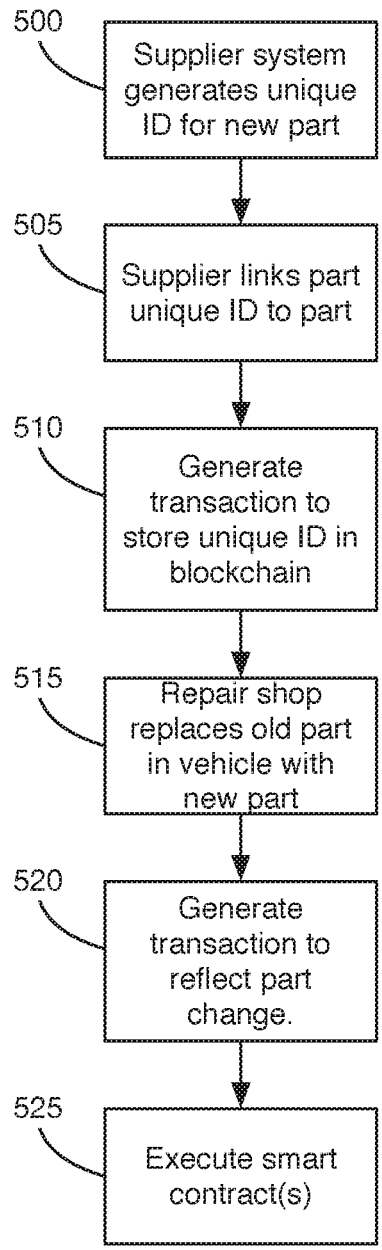
FIG. 5A illustrates additional exemplary operations that may be implemented by the component supplier and OEM systems of the environment to incentivize using genuine OEM parts.

Referring to FIG. 5A, at operation 500, a component supplier system 105 may generate a unique ID for a new component or request the unique ID from the logic of the decentralized database 109 configured to create unique IDs. At operation 505, the component supplier may physically link the unique ID to part.

At operation 510, the component supplier system 105 may generate a transaction to store the unique ID in the distributed database 109. The unique ID may be encrypted/hashed, as described above. The transaction may include one or more so-called smart contract. For example, a first smart contract may be configured to transfer fungible assets to, for example, a repair shop if the corresponding component is used. A second smart contract may be configured to provide an extended warranty with the new component.

At operation 515, a repair shop may need to replace a component in a vehicle with the new component. In this case, an operator at the repair shop may retrieve a replacement component from a part room of the repair shop. The operator may use the repair shop system 115 to determine whether the replacement part is genuine or non-approved. For example, the repair shop system 115 may include a scanner that facilitates scanning identifying information of the component. The identifying information may be in the form of a bar code, QR code, RFid tag, etc. that may be affixed to the component. The repair shop system 115 may then check whether the part is genuine or a non-approved part (e.g., a counterfeit and/or misfit part) by querying the decentralized database 109 for a component associated with the identifying information via, for example, the OEM system 119. If one is not found or a misfit part was found, the repair shop system 115 may indicate to the operator that the replacement component is a misfit or a counterfeit component (e.g., a non-approved component).

On the other hand, if the part is genuine and fits properly, the operator may indicate, via the repair shop system 115, to the OEM system 110 that the replacement part will be installed in a vehicle.

At operation 520, the OEM system 110 may generate a transaction to indicate that the new component (e.g., Gear A-SN333456) is associated with the vehicle (VID ABC123456).

At operation 525, the transaction may invoke the smart contracts if the data integrity is sufficient. The transaction invokes the smart contracts and returns only expected information, events, and/or behavior. The smart contract API may return error codes. In this case, no ledge update will be performed. Following the examples above, the repair shop may be provided with a rebate and an extended warranty may be provided with the new component.

Figure 5B:
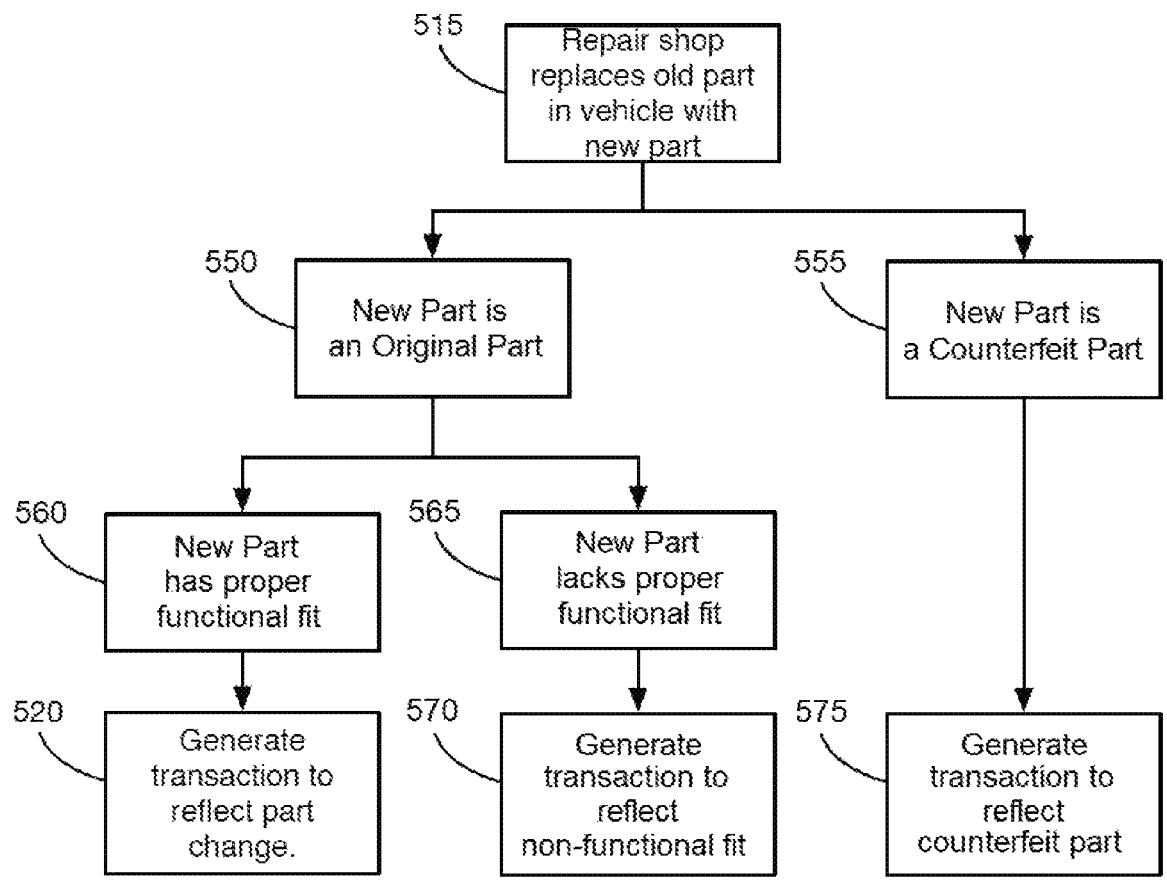
FIG. 5B illustrates additional details of the exemplary operations illustrated in FIG. 5A.

FIG. 5B illustrates additional details of the operations illustrated in FIG. 5A. As with FIG. 5A, at operation 515, a repair shop may need to replace a component in a vehicle with the new component. At operations 550 and 555, the repair shop system 115 determines if the new part is an original, genuine part (550) or a counterfeit part (555). For example, as discussed above with respect to FIG. 5A, the repair shop system 115 may query the decentralized database 109 for a component associated with the identifying information of the new part via, for example, the OEM system 119. If the new part is an original, genuine part (550), then repair shop system 115 determines if the new part has a proper functional fit (560) or lacks a proper functional fit (565). If the repair shop system 115 determines that new part is an original, genuine part (550) and has a proper functional fit (560), the repair shop system 115 may then generate the transaction to reflect the part change (520), as discussed with respect to FIG. 5A. However, if the repair shop system 115 determines that new part lacks a proper functional fit (565), the repair shop system 115 may then generate a transaction to reflect that the new part does not have proper functional fit (570). Similarly, if the repair shop system 115 determines that new part is a counterfeit part (555), the repair shop system 115 may then generate a transaction to reflect that the new part is a counterfeit part (575).

FIG. 6A illustrates additional exemplary transactions that may be generated based on the operations of FIGS. 5A and 5B. Referring to the FIG. 6A, a third exemplary transaction 605 is used to indicate that a new component at address T1M-C3 is associated with the vehicle at address OEM-V1. The new component in this case is Gear A and has the unique ID (CID) SN333456. A fourth transaction 610 may be generated based on a first smart contract of the transaction to provide an extended warranty to the vehicle. A fifth transaction 615 may be generated based on a second smart contract of the transaction to provide a rebate to the repair shop associated with destination address RS-R1.

FIG. 6B illustrates and exemplary listing of parts that may be associated with the vehicle upon processing the transactions of FIG. 6A. According to FIG. 6B, component Gear A with unique ID SN123456 has been replaced with a new Gear A having the unique ID SN333456.

Figure 7:
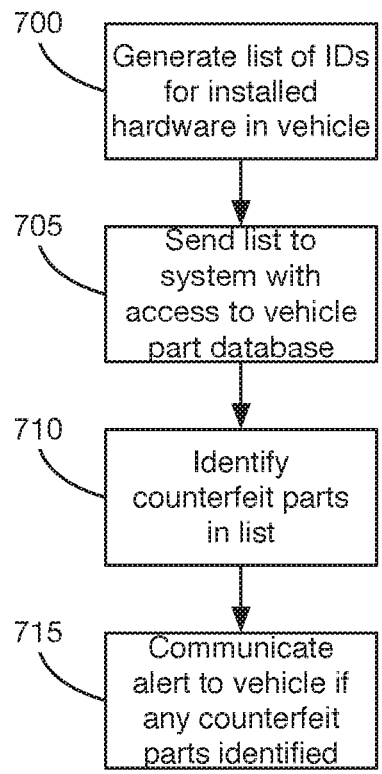
FIG. 7 illustrates exemplary operations that may be implemented by systems of the environment to facilitate detecting non-approved components in a vehicle.

FIG. 7 illustrates exemplary operations that may be implemented by systems of the environment 100 to facilitate detecting non-approved components in a vehicle. The various operations may be implemented via instruction code executed by respective CPUs 225 of one or more of the OEM and vehicle systems (110 and 120) for causing the CPUs 225 to perform the operations.

Referring to FIG. 7, at operation 700, a vehicle system 120 may generate a list of installed hardware in the vehicle. For example, components of the vehicle may be in communication with the vehicle system 120. For example, the vehicle system 120 may correspond to an electronic control unit (ECU) that communicates with the components via a data bus such as a CAN bus. Each component may be associated with a unique ID. An instruction code agent of the vehicle system 120 may communicate with the components to determine the unique ID.

At operation 705, the vehicle system 120 may communicate the list of component IDs to, for example, an OEM system 110 via an interface of the OEM system 110.

At operation 710, the OEM system 110 may determine, based on information in the decentralized database 109, that one or more of the components in the list are not supposed to be installed in the vehicle and/or have not been defined in the decentralized database 109 by a component supplier 105.

At operation 715, the OEM system 110 may communicate an alert to the vehicle system 120 related to detection of one or more non-approved components. The alert may be communicated to the end user of the vehicle via a warning indicator of the vehicle or the like.

In some instances, the OEM system 110 may be aware of safety concerns with the non-approved part or an OEM part installed in the vehicle. In this case, the OEM system may communicate instructions to the vehicle system 120 to prevent use of the vehicle after a predetermined number of warnings have been issued related to the safety concern. In addition, or alternatively, the OEM system 110 may communicate instructions to the vehicle system 120 to adjust operational parameters of the vehicle to mitigate the safety concerns. The vehicle system 120 may then adjust the parameters accordingly.

Figure 8:
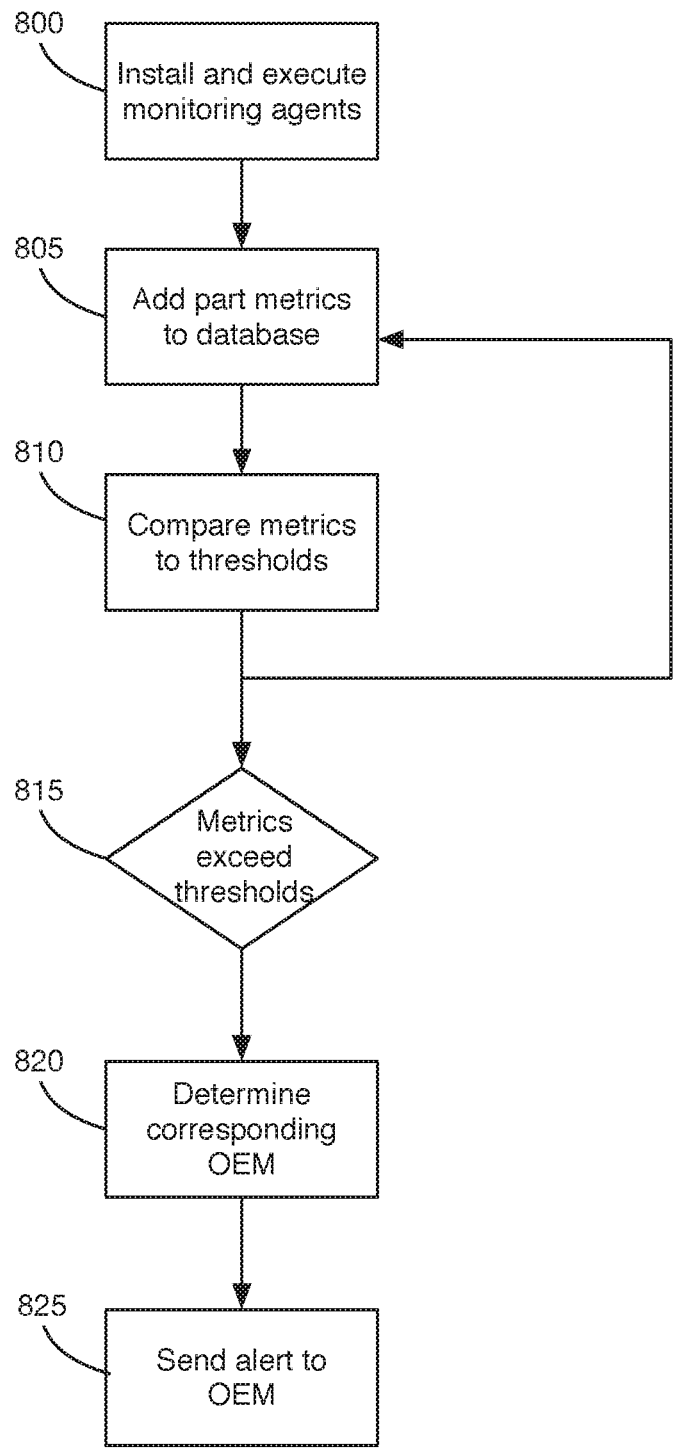
FIG. 8 illustrates exemplary operations for monitoring production of components made by a supplier and that are destined for a specific original equipment manufacturer (OEM)

FIG. 8 illustrates exemplary operations for monitoring production of components made by a supplier, and that are destined for a specific original equipment manufacturer (OEM). The various operations may be implemented via instruction code executed by respective CPUs 225 of one or more of the component supplier and OEM systems (105 and 115) for causing the CPUs 225 to perform the operations.

Referring to FIG. 8, at operation 800, one or more instruction code agents for monitoring component metrics stored in a database may be installed on, for example, the component supplier system 105. The agents may be associated with a specific OEM 110. The OEM may have preapproved the operation and configuration of the agent. For example, the OEM may have specified one or more production thresholds against which component metrics are evaluated.

At operation 805, the component supplier may generate a record in the database that specifies a plurality of production metrics associated with a component. The metrics may include an indication of a criticality of the component, sub-component information of the component, supplier information, a part number, manufacturing lot/batch information, a production part approval process associated with the component, etc. Records may be added for each component coming off the assembly line.

At operation 810, each agent may determine whether metrics to be checked by the agent, and that are associated with the components, have exceeded one or more of the production thresholds used by the agent.

If at operation 815, an agent determines that one or more metrics exceed a threshold, then at operation 820, an OEM associated with the agent may be determined.

At operation 825, and alert indicative of the threshold may be communicated to the OEM via, for example, a network connection to the OEM.

The operations in FIG. 8 may be performed in real-time, as component metrics are being added to the database. The operations allow an OEM relatively instant access to production metrics associated with components destined to the OEM. When alerts are issued, the OEM may determine that the component supplier is having production issues, which could result in products that are deficient in some way. This in turn may allow the OEM to quickly switch to a second source for the component, thus alleviating potential downtime in a factory of the OEM.

FIG. 9 illustrates a computer system 900 that may form part of or implement the systems described above. The computer system 900 may include a set of instructions 945 that the processor 905 may execute to cause the computer system 900 to perform any of the operations described above. The computer system 900 may operate as a standalone device or may be connected, e.g., using a network, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile device, capable of executing the instructions 945 (sequential or otherwise) that specify actions to be taken by that machine. Further, each of the systems described may include any collection of subsystems that individually or jointly execute a set, or multiple sets, of instructions to perform one or more computer functions.

The computer system 900 may include one or more memory devices 910 on a bus 920 for communicating information. In addition, code operable to cause the computer system to perform any of the operations described above may be stored in the memory 910. The memory 910 may be a random-access memory, read-only memory, programmable memory, hard disk drive or any other type of memory or storage device.

The computer system 900 may include a display 930, such as a liquid crystal display (LCD), a cathode ray tube (CRT), or any other display suitable for conveying information. The display 930 may act as an interface for the user to see the functioning of the processor 905, or specifically as an interface with the software stored in the memory 910 or in the drive unit 915.

Additionally, the computer system 900 may include an input device 925, such as a keyboard or mouse, configured to allow a user to interact with any of the components of system 900.

The computer system 900 may also include a disk or optical drive unit 915. The disk drive unit 915 may include a computer-readable medium 940 in which the instructions 945 may be stored. The instructions 945 may reside completely, or at least partially, within the memory 910 and/or within the processor 905 during execution by the computer system 900. The memory 910 and the processor 905 also may include computer-readable media as discussed above.

The computer system 900 may include a communication interface 935 to support communications via a network 950. The network 950 may include wired networks, wireless networks, or combinations thereof. The communication interface 935 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made, and equivalents may be substituted without departing from the scope of the claims. Many other modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for detecting non-approved parts in a vehicle, the method comprising:
   generating a plurality of component identifiers (IDs) for a plurality of components, wherein each component ID identifies a unique component of the plurality of components;
   storing the plurality of component IDs to a decentralized database;
   generating a vehicle identifier (ID) that uniquely identifies a vehicle;
   storing the vehicle ID to the decentralized database;
   associating, in the decentralized database, component IDs associated with components of the vehicle with the vehicle ID;
   subsequently, determining that a component of the vehicle has been replaced with a replacement component;
   searching the decentralized database for a component ID associated with the replacement component;

when the component ID associated with the replacement component is not found,
  determining that the replacement component is a non-approved component;
  issuing an alert to the vehicle indicative of the determination;
otherwise when the component ID associated with the replacement component is found, updating the decentralized database to associate the component ID associated with the replacement component with the vehicle ID.

2. The method according to claim 1, wherein the decentralized database stores block-chain records.

3. The method according to claim 1, wherein the decentralized database includes a one or more smart contracts that, when executed, transfer fungible assets to an installer of the replacement component when the replacement component ID is found in the decentralized database.

4. The method according to claim 1, wherein the vehicle includes a processor and a plurality of components in communication with the processor, wherein each of the plurality of components in communication with the processor stores a unique component ID, wherein determining that a component of the vehicle has been replaced with a replacement component comprises:
  detecting, by the processor, a previously undetected component ID.

5. The method according to claim 1, wherein the component ID for each component is generated by encrypting a part number associated with the component.

6. A method for monitoring production of components made by a supplier and destined for a specific original equipment manufacturer (OEM), the method comprising:
  for each of a plurality of components, generating a record in a database that specifies a plurality of production metrics associated with the component, wherein for each component, the metrics include one or more of: an indication of a criticality of the component, sub-component information of the component, supplier information, a part number, manufacturing lot/batch information, a production part approval process associated with the component;
  monitoring, by each of a plurality of instruction code agents, one or more metrics of the plurality of components;
  determining, by each agent, whether metrics associated with the plurality of components have exceeded one or more production thresholds associated with the agent;
  when an agent determines that an associated production threshold exceeds a threshold:
    determining an OEM associated with the agent; and
    communicating, by the agent and via a network connection to the OEM, an alert indicative of the threshold that has been exceeded.

7. The method according to claim 6, wherein the metrics are monitored in real-time as records are generated.

8. The method according to claim 6, wherein for each agent, functionality of the agent and thresholds associated with the agent are preapproved by an OEM associated with the agent, and wherein each agent operates on a computers system of the supplier.

9. The method according to claim 6, further comprising generating, by a supplier computer system, a dashboard that that displays one or more metrics being monitored by the one or more agents.

10. A system for detecting non-approved parts in a vehicle, the system comprising:
  a component supplier system; and
  an original equipment manufacturer (OEM) system in network communication with the component supplier system;
  wherein the component supplier system performs acts comprising:
    generating a plurality of component identifiers (IDs) for a plurality of components, wherein each component ID identifies a unique component of the plurality of components;
    storing the plurality of component IDs to a decentralized database;
  wherein the OEM system performs acts comprising:
    generating a vehicle identifier (ID) that uniquely identifies a vehicle;
    storing the vehicle ID to the decentralized database;
    associating, in the decentralized database, component IDs associated with components of the vehicle with the vehicle ID;
    subsequently, determining that a component of the vehicle has been replaced with a replacement component;
    searching the decentralized database for a component ID associated with the replacement component;
    when the component ID associated with the replacement component is not found,
      determining that the replacement component is a non-approved component;
      issuing an alert to the vehicle indicative of the determination;
    otherwise when the component ID associated with the replacement component is found, updating the decentralized database to associate the component ID associated with the replacement component with the vehicle ID.

11. The system according to claim 10, wherein the decentralized database stores block-chain records.

12. The system according to claim 10, wherein the decentralized database includes a one or more smart contracts that, when executed, transfer fungible assets to an installer of the replacement component when the replacement component ID is found in the decentralized database.

13. The system according to claim 10, wherein the vehicle includes a processor and a plurality of components in communication with the processor, wherein each of the plurality of components in communication with the processor stores a unique component ID, wherein determining that a component of the vehicle has been replaced with a replacement component comprises:
  detecting, by the processor, a previously undetected component ID.

14. The system according to claim 10, wherein the component ID for each component is generated by encrypting a part number associated with the component.

15. A system for monitoring production of components made by a supplier and destined for a specific original equipment manufacturer (OEM), the system comprising:
  non-transitory instruction code storage; and
  a processor in communication with the non-transitory instruction code storage, wherein the non-transitory instruction code storage stores instructions that when executed by the processor cause the processor to perform acts comprising:

for each of a plurality of components, generating a record in a database that specifies a plurality of production metrics associated with the component;

monitoring, by each of a plurality of instruction code agents, one or more metrics of the plurality of components;

determining, by each agent, whether metrics associated with the plurality of components have exceeded one or more production thresholds associated with the agent;

when an agent determines that an associated production threshold exceeds a threshold:
determining an OEM associated with the agent; and
communicating, by the agent and via a network connection to the OEM, an alert indicative of the threshold that has been exceeded.

16. The system according to claim 15, wherein the metrics are monitored in real-time as records are generated.

17. The system according to claim 15, wherein for each component, the metrics include one or more of: an indication of a criticality of the component, sub-component information of the component, supplier information, a part number, manufacturing lot/batch information, a production part approval process associated with the component.

18. The system according to claim 15, wherein for each agent, functionality of the agent and thresholds associated with the agent are preapproved by an OEM associated with the agent.

19. The system according to claim 15, wherein the instruction code causes the processor to implement a dashboard that that displays one or more metrics being monitored by the one or more agents.

* * * * *